(12) United States Patent
Lee et al.

(10) Patent No.: US 10,111,231 B2
(45) Date of Patent: Oct. 23, 2018

(54) METHOD AND APPARATUS FOR PERFORMING D2D OPERATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/128,400

(22) PCT Filed: Mar. 30, 2015

(86) PCT No.: PCT/KR2015/003095
§ 371 (c)(1),
(2) Date: Sep. 22, 2016

(87) PCT Pub. No.: WO2015/147605
PCT Pub. Date: Oct. 1, 2015

(65) Prior Publication Data
US 2017/0230958 A1      Aug. 10, 2017

Related U.S. Application Data

(60) Provisional application No. 61/971,544, filed on Mar. 28, 2014.

(51) Int. Cl.
*H04W 72/04* (2009.01)
*H04W 72/08* (2009.01)
(Continued)

(52) U.S. Cl.
CPC ..... *H04W 72/048* (2013.01); *H04W 72/0413* (2013.01); *H04W 72/08* (2013.01);
(Continued)

(58) Field of Classification Search
CPC . H04W 72/048; H04W 76/023; H04W 72/08; H04W 72/0413; H04W 72/02
See application file for complete search history.

(56) References Cited

U.S. PATENT DOCUMENTS

2013/0230032 A1* 9/2013 Lu ................. H04W 76/023
                                                       370/336
2013/0308549 A1* 11/2013 Madan .............. H04W 28/26
                                                       370/329
(Continued)

FOREIGN PATENT DOCUMENTS

WO      2013052163 A1     4/2013

OTHER PUBLICATIONS

LG Electronics, "Operation in Mode 1 resource allocation for D2D communication", 3GPP TSG RAN WG1 Meeting #76bis, R1-141352, Mar. 22, 2014, 3 pages.
(Continued)

*Primary Examiner* — Mohammad S Anwar
(74) *Attorney, Agent, or Firm* — Lee, Hong, Degerman, Kang & Waimey

(57) ABSTRACT

A method and apparatus for performing a device-to-device (D2D) operation in a wireless communication system is provided. A user equipment (UE) receives a D2D mode criterion from a network, and performs the D2D operation based on a D2D mode indicated by the D2D mode criterion. The D2D mode criterion may indicate various information, and may be either a D2D mode 1 or a D2D mode 2.

12 Claims, 11 Drawing Sheets

(51) Int. Cl.
  *H04W 76/02*  (2009.01)
  *H04W 76/14*  (2018.01)
  *H04W 72/02*  (2009.01)

(52) U.S. Cl.
  CPC ......... *H04W 76/023* (2013.01); *H04W 76/14* (2018.02); *H04W 72/02* (2013.01)

(56) References Cited

U.S. PATENT DOCUMENTS

| | | | | |
|---|---|---|---|---|
| 2014/0003320 A1* | 1/2014 | Etemad | ................... | H04W 4/06 370/312 |
| 2014/0056220 A1* | 2/2014 | Poitau | ................. | H04W 40/246 370/328 |
| 2014/0064163 A1* | 3/2014 | Tsirtsis | ................. | H04W 8/005 370/311 |
| 2014/0335875 A1* | 11/2014 | Li | ........................ | H04W 8/005 455/450 |
| 2015/0049608 A1* | 2/2015 | Palm | .................... | H04W 76/10 370/230 |

OTHER PUBLICATIONS

Samsung, "Mode 2 resource allocation for D2D broadcast communication", 3GPP TSG RAN WG1 Meeting #76bis, R1-141306, Mar. 22, 2014, 6 pages.

ZTE, "Scheduling-based D2D Communication Resource Allocation", 3GPP TSG-RAN WG1 Meeting #76bis, R1-141427, Mar. 22, 2014, 4 pages.

Sony, "D2D Resource Pool and Scheduling Assignments", 3GPP TSG-RAN WG1 Meeting #76bis, R1-141571, Mar. 22, 2014, 5 pages.

* cited by examiner

METHOD AND APPARATUS FOR PERFORMING D2D OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2015/003095, filed on Mar. 30, 2015, which claims the benefit of U.S. Provisional Application No. 61/971,544 filed on Mar. 28, 2014, the contents of which are all hereby incorporated by reference herein in their entirety.

BACKGROUND OF THE INVENTION

Field of the Invention

The present invention relates to wireless communications, and more particularly, to a method and apparatus for performing a device-to-device (D2D) operation in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. The D2D operation may be performed based on various D2D modes, which correspond various resource allocation schemes. For efficient D2D operation, a D2D mode criterion needs to be informed to the UE.

SUMMARY OF THE INVENTION

The present invention provides a method and apparatus for performing a device-to-device (D2D) operation in a wireless communication system. The present invention provides a method for receiving a mode criterion, and performing the D2D operation based on a D2D mode indicated by the mode criterion.

In an aspect, a method for performing, by a user equipment (UE), a device-to-device (D2D) operation in a wireless communication system is provided. The method includes receiving, by the UE, a D2D mode criterion from a network, and performing, by the UE, the D2D operation based on a D2D mode indicated by the D2D mode criterion.

In another aspect, a user equipment (UE) is provided. The UE includes a memory, a transceiver, and a processor coupled to the memory and the transceiver, and configured to receive a device-to-device (D2D) mode criterion from a network, and perform the D2D operation based on a D2D mode indicated by the D2D mode criterion.

A D2D operation can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA.

The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
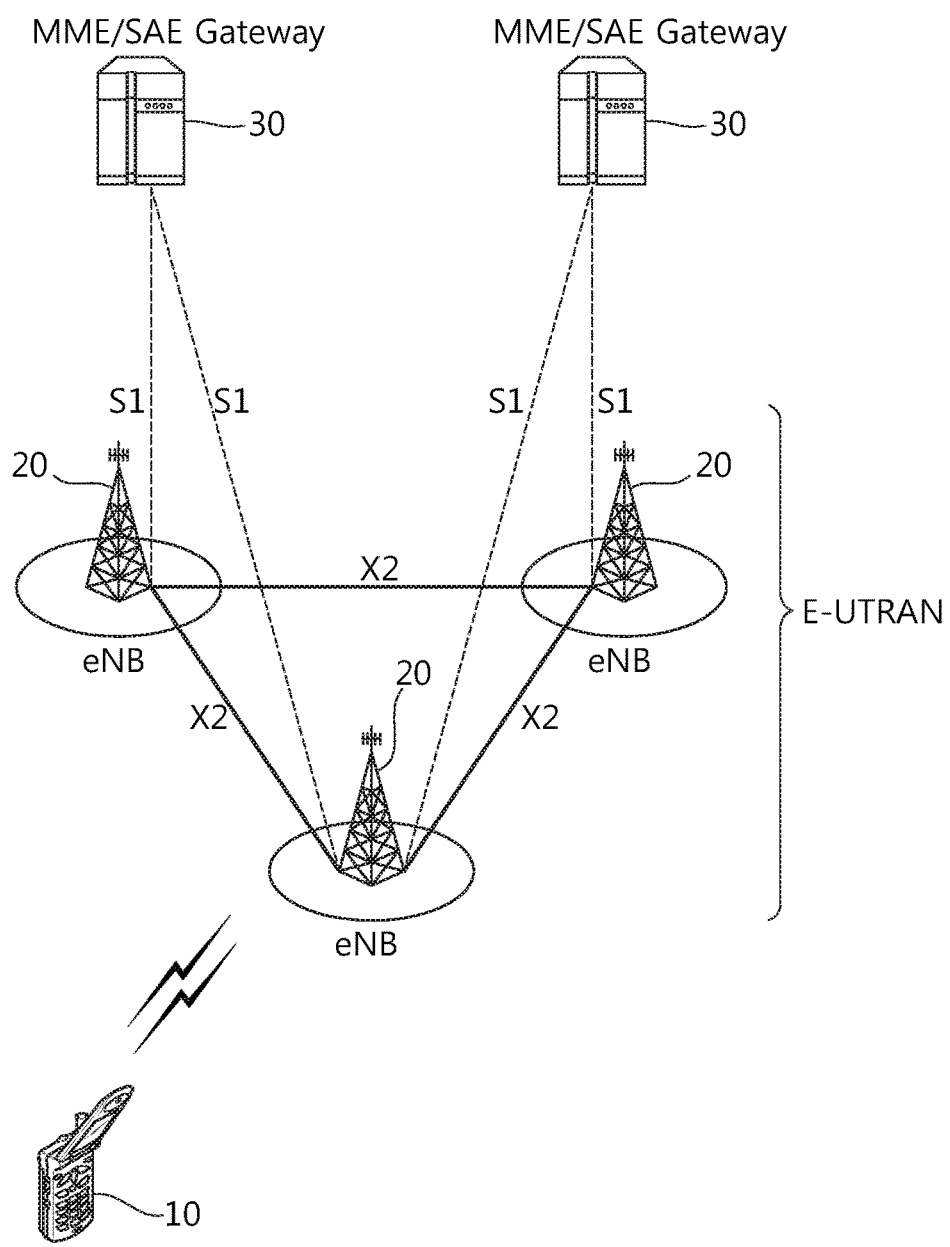
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
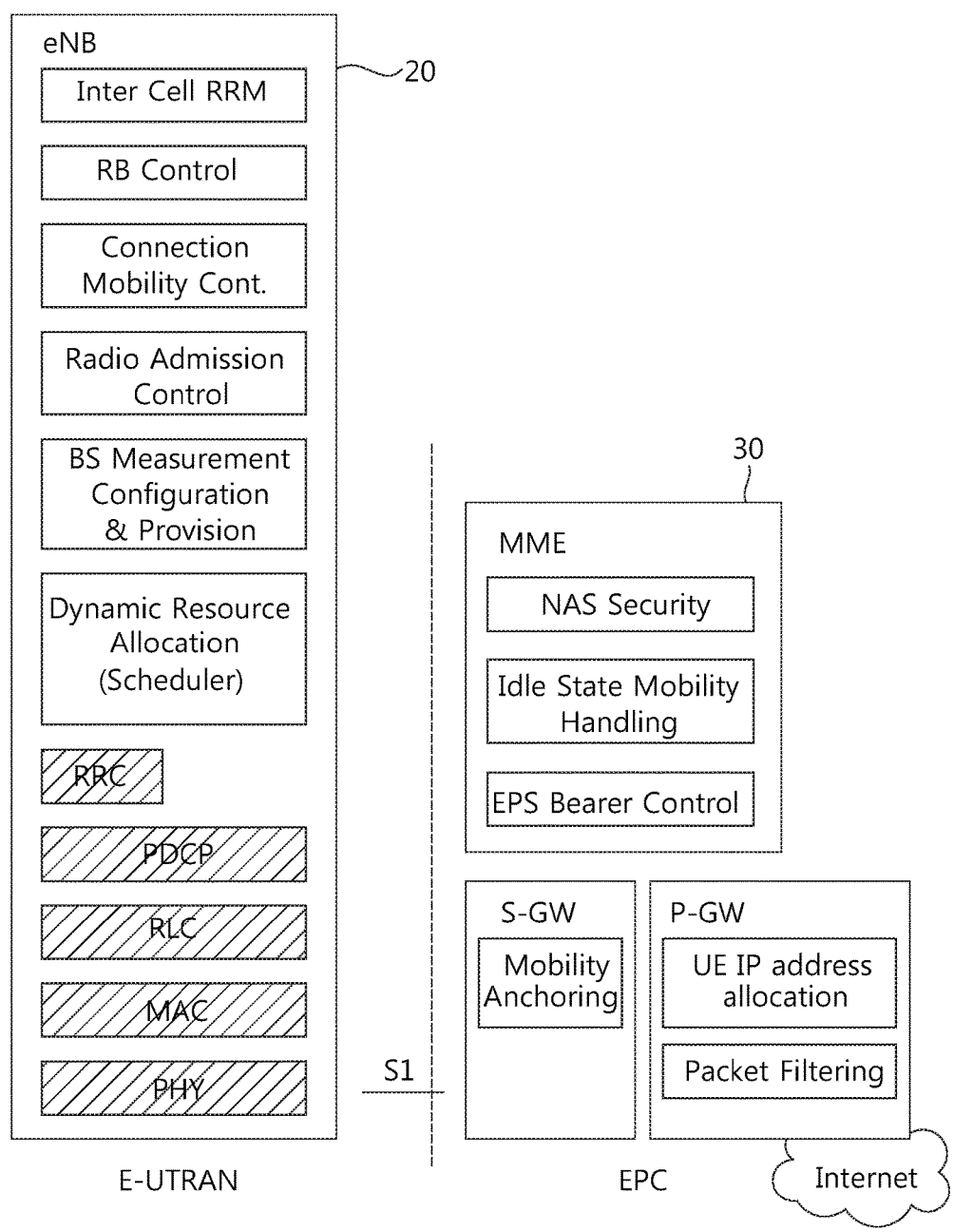
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
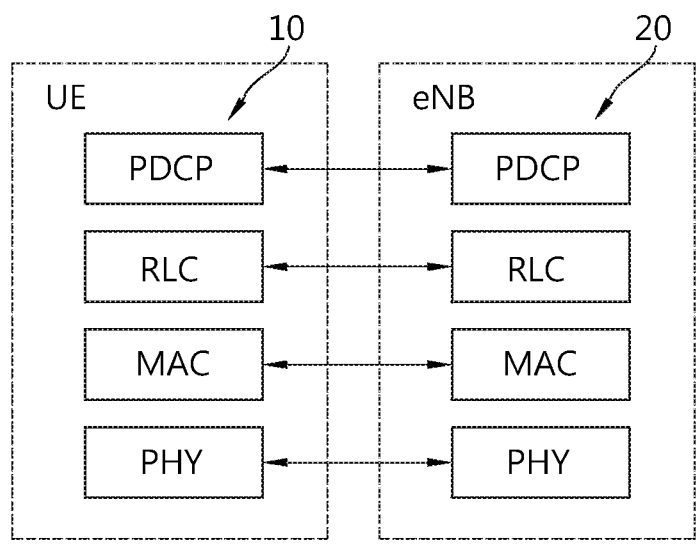
FIG. 3 shows a block diagram of a user plane protocol stack of an LTE system.
Figure 4:
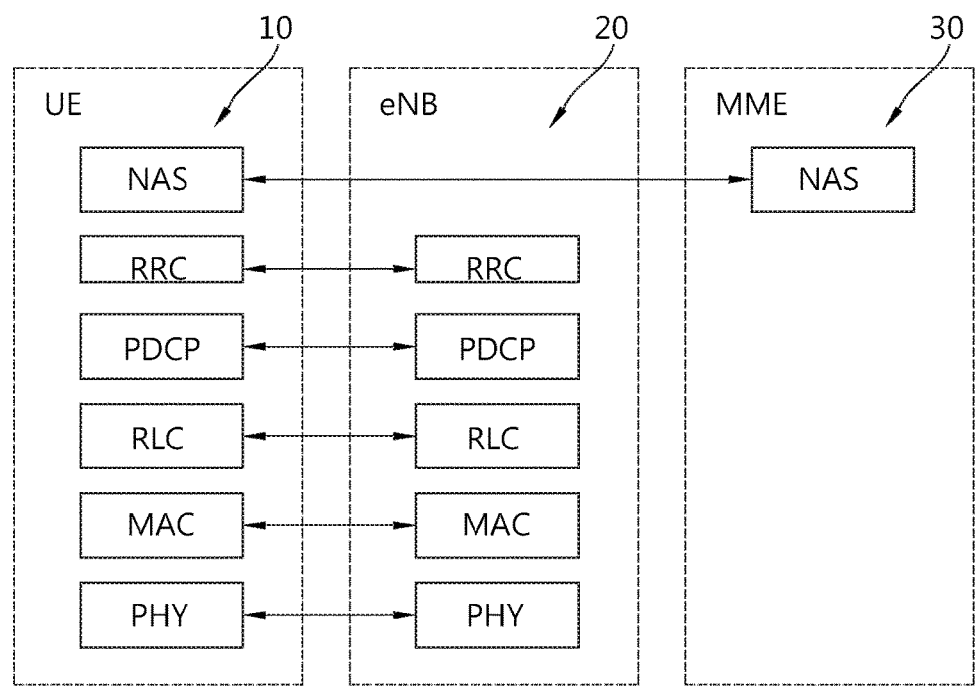
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
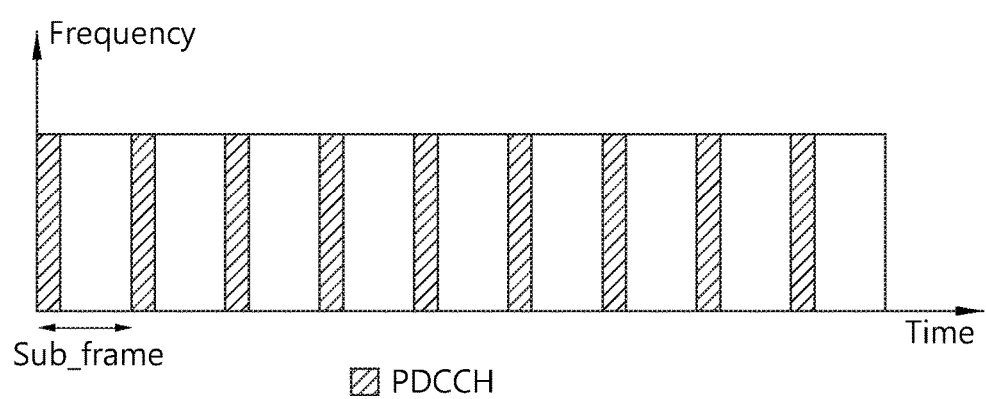
FIG. 5 shows an example of a physical channel structure.

FIG. 5 shows an example of a physical channel structure. A physical channel transfers signaling and data between PHY layer of the UE and eNB with a radio dresource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Figure 6:
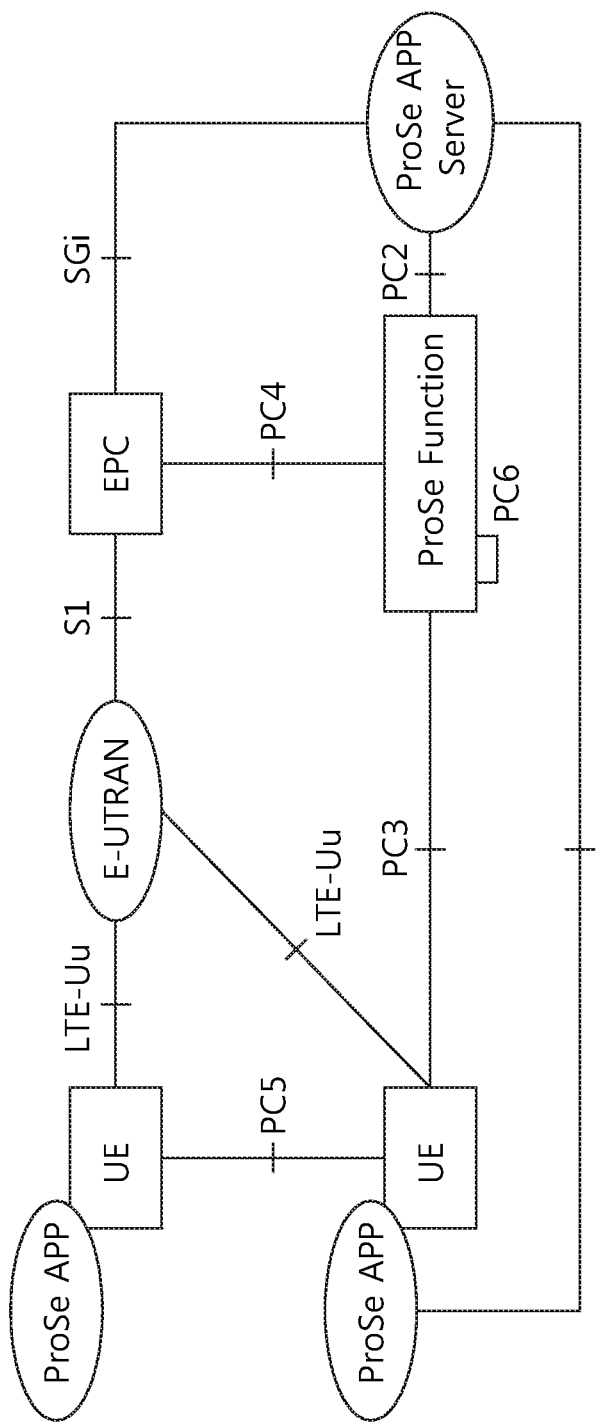
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
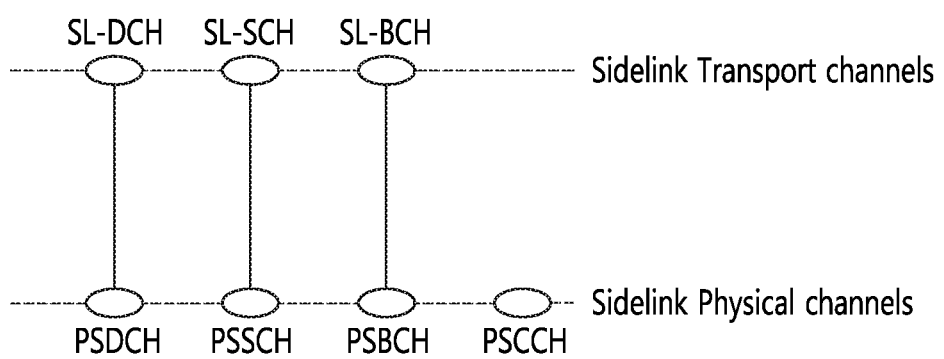
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
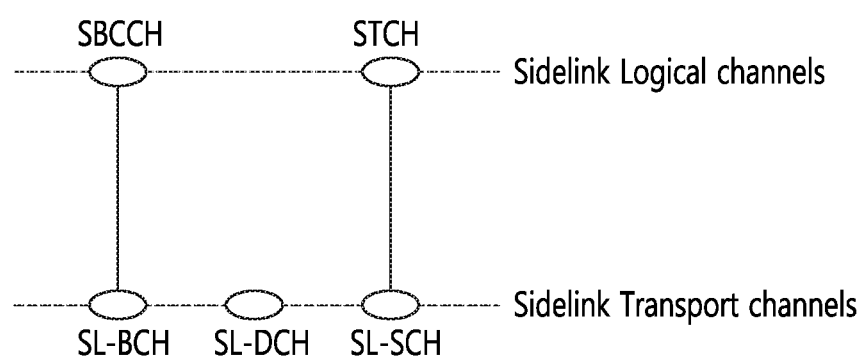
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise the UE uses pre-configured parameters. There is only one subframe every 40 ms for synchronization signal and SBCCH transmission for in-coverage operation. SIB18 provides the resource information for synchronization signal and SBCCH transmission. There are two pre-configured subframes every 40 ms for out of coverage operation. The UE receives synchronization signal and SBCCH in one subframe and transmit synchronization signal and SBCCH on another subframe if UE becomes synchronization source based on defined criterion.

The UE performs Prose direct communication on subframes defined over the duration of sidelink control period. The sidelink control period is the period over which resources allocated in a cell for sidelink control and sidelink data transmissions occur. Within the sidelink control period the UE sends a sidelink control followed by data. Sidelink control indicates a layer 1 ID and characteristics of the transmissions (e.g. MCS, location of the resource(s) over the duration of sidelink control period, timing alignment).

The UE performs transmission and reception of Uu and PC5 with the following decreasing priority order:
  Uu transmission/reception (highest priority);
  PC5 ProSe direct communication transmission/reception;
  PC5 ProSe direct discovery transmission/reception (lowest priority).

The UE supporting ProSe direct communication can operate in two modes for resource allocation. First is scheduled resource allocation (hereinafter, D2D mode 1), in which the UE needs to be RRC_CONNECTED in order to transmit data, and the UE requests transmission resources from the eNB. The eNB schedules transmission resources for transmission of sidelink control and data. The UE sends a scheduling request (dedicated SR or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured SL-RNTI. Second is UE autonomous resource selection (hereinafter, D2D mode 2), in which the UE on its own selects resources from resource pools to transmit sidelink control and data.

The UE in RRC_CONNECTED may send the ProSe direct indication to the eNB when the UE becomes interested in ProSe direct communication. In response eNB may configure the UE with a SL-RNTI. The UE is considered in-coverage for ProSe direct communication whenever it detects a cell on a public safety ProSe carrier. The following rules apply for the UE:
  If the UE is out of coverage, it can only use UE autonomous resource selection;
  If the UE is in coverage, it may use scheduled resource allocation or autonomous resource selection as per eNB configuration;
  If the UE is in coverage, it shall use only the resource allocation mode indicated by eNB configuration unless one of the exceptional cases occurs. When an exceptional case occurs, the UE is allowed to use UE autonomous resource selection temporarily even though it was configured to use scheduled resource allocation. Resource pool to be used during exceptional case may be provided by the eNB.

The resource pools for sidelink control when the UE is out of coverage are configured as below:
  The resource pool used for reception is pre-configured;
  The resource pool used for transmission is pre-configured.

The resource pools for sidelink control when the UE is in coverage are configured as below:
  The resource pool used for reception is configured by the eNB via RRC, in broadcast signaling;
  The resource pool used for transmission is configured by the eNB via RRC, in dedicated or broadcast signaling, if UE autonomous resource selection is used;
  The resource pool used for transmission is configured by the eNB via RRC, in dedicated signaling if scheduled resource allocation is used;
  The eNB schedules the specific resource(s) for sidelink control transmission within the configured reception pool.

In order to perform communication even when some UEs are in-coverage and some
UEs are out of coverage, all UEs (i.e. both in and out of coverage) should be configured with resource pools for sidelink control which is the union of the resource pools used for transmission of sidelink control in neighbor cells and transmission of sidelink control resource pool out of coverage.

The resource pools for data when the UE is out of coverage are configured as below:
  The resource pool used for reception is pre-configured;
  The resource pool used for transmission is pre-configured.

The resource pools for data when the UE is in coverage are configured as below:
  The resource pools used for transmission and reception are configured by the eNB via RRC, in dedicated or broadcast signaling, if UE autonomous resource selection is used;
  There is no resource pool for transmission if scheduled resource allocation is used.

Hereinafter, a method for performing the D2D operation according to an embodiment of the present invention.

Figure 9:
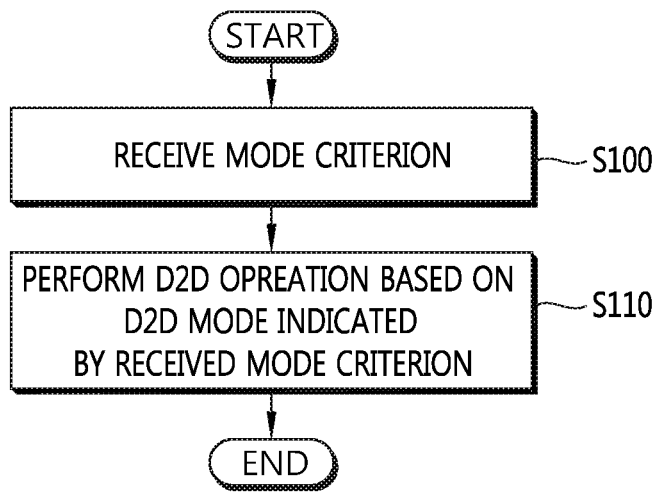
FIG. 9 shows an example of a method for performing a D2D operation according to an embodiment of the present invention.

FIG. 9 shows an example of a method for performing a D2D operation according to an embodiment of the present invention. It is assumed that the UE is camped on a cell and detects user traffic to be transmitted or received over the direct interface among UEs, i.e. sidelink.

In step S100, the UE receives a D2D mode criterion. The D2D mode criterion may indicate that if a specific type of traffic is provided over the direct interface, a specific D2D mode is used by the UE for the D2D operation. For example, if voice or video traffic is provided by D2D communication, D2D mode 1 may be used by the UE for the D2D operation. If background traffic is provided by D2D communication, D2D mode 2 may be used by the UE for the D2D operation. Further, the D2D mode criterion may indicate that if the UE is in RRC_CONNECTED, a specific D2D mode is used by the UE for the D2D operation. Or, the D2D mode criterion may indicate that if D2D mode 1 and/or D2D mode 2 is used by the UE, the UE should be in RRC_CONNECTED. Further, the D2D mode criterion may indicate the RRC state of the UE performing the D2D operation. For example, if the UE performs D2D transmission, the D2D mode criterion may indicate that the UE should be in RRC_CONNECTED. If the UE performs D2D reception, the D2D mode criterion may indicate that the UE should be in RRC_IDLE or RRC_CONNECTED. Further, the D2D mode criterion may indicate a mapping between QoS characteristics and the D2D mode. Further, the D2D mode criterion may indicate a mapping between device types and the D2D mode.

In step S110, the UE performs the D2D operation based on the D2D mode indicated by the D2D mode criterion. The D2D mode may be either the D2D mode 1 or D2D mode 2. The UE may establish the RRC connection with the network, either if the UE determines that the D2D mode 1 will be used based on the received D2D mode criterion, or if the received D2D mode criterion indicates that the UE should be in RRC_CONNECTED.

The present invention will be described with more detailed embodiment.

Figure 10:
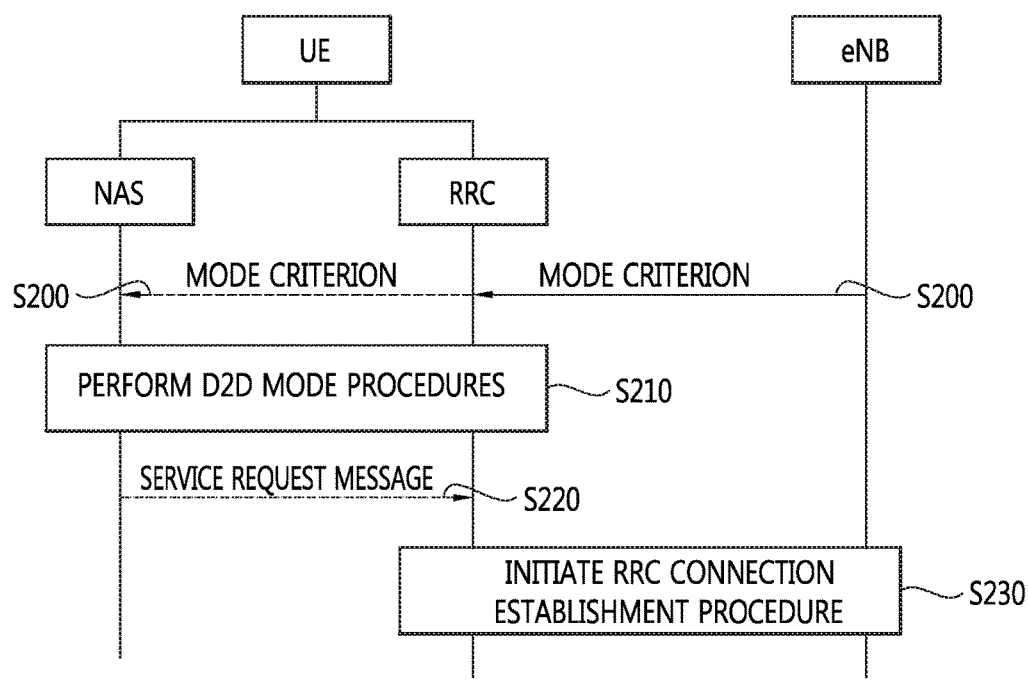
FIG. 10 shows another example of a method for performing a D2D operation according to an embodiment of the present invention.

FIG. 10 shows another example of a method for performing a D2D operation according to an embodiment of the present invention.

In step S200, the UE in RRC_IDLE or in RRC_CONNECTED receives the D2D mode criterion. The D2D mode criterion may indicate one or more information elements on the D2D mode as follows.

Mapping between a specific service/application over direct interface and D2D mode: For example, the D2D mode 1 may correspond to voice service, and/or video service over direct interface, and the D2D mode 2 may correspond to short message service, image, background traffic, and/or machine-type communication (MTC) specific service/applications.

Mapping between QoS characteristics and D2D mode: For example, the D2D mode 1 may correspond to the first set of QoS class identifiers (QCIs), e.g. for QCI1 and QCI5, and the D2D mode 2 may correspond to the second set of QCIs, e.g. for QCI9. For example, the D2D mode 1 may correspond to delay-sensitive service/application, and the D2D mode 2 may correspond to delay-tolerant service/application. For example, the D2D mode 1 may correspond to high data rate D2D transmission/reception or for data rate higher than a threshold (N1 kbps), and the D2D mode 2 may correspond to low data rate D2D transmission/reception or for data rate lower than a threshold (N2 kbps). For example, the D2D mode 1 may correspond to long-lived D2D transmission/reception or for long D2D transmission time higher than a threshold (N1 seconds), and the D2D mode 2 may correspond to short-lived D2D transmission/reception or for short D2D transmission time lower than a threshold (N2 seconds). The threshold may be configured by the network or pre-configured.

Mapping between device types and D2D mode: For example, the D2D mode 1 may correspond to the normal UEs, other than D2D/MTC devices, and the D2D mode 2 may correspond to D2D devices and/or MTC devices.

Mapping between RRC state and D2D mode: For example, the D2D mode 1 may correspond to RRC_CONNECTED (i.e. the UE shall enter RRC_CONNECTED for the D2D mode 1). The D2D mode 2 may correspond to RRC_CONNECTED (i.e. the UE shall enter RRC_CONNECTED for the D2D mode 2, or RRC_IDLE (i.e. the UE shall be in RRC_IDLE if there is no other reason for entering RRC_CONNECTED than the D2D operation).

Mapping between a specific service/application and RRC states: For example, the D2D mode criterion may indicate RRC_CONNECTED for voice service or video service over direct interface (i.e. the UE shall enter RRC_CONNECTED for this service/application). Or, the D2D mode criterion may indicate RRC_IDLE for short message service, image, background traffic, and/or MTC specific service/application over direct interface (i.e. the UE shall be in RRC_IDLE for this service/application if there is no other reason for entering RRC_CONNECTED).

Mapping between QoS characteristics and RRC states: For example, the D2D mode criterion may indicate RRC_CONNECTED for the first set of QCIs, e.g. for QCI1 and QCI5, and RRC_IDLE for the second set of QCIs, e.g. for QCI9. For example, the D2D mode criterion may indicate RRC_CONNECTED for delay-sensitive service/application, and RRC_IDLE for delay-tolerant service/application. For example, the D2D mode criterion may indicate RRC_CONNECTED for high data rate D2D transmission/reception or for data rate higher than a threshold (N1 kbps), and RRC_IDLE for low data rate D2D transmission/reception or for data rate lower than a threshold (N2 kbps). For example, the D2D mode criterion may indicate RRC_CONNECTED for long-lived D2D transmission/reception or for long D2D transmission time higher than a threshold (N1 seconds), and RRC_IDLE for short-lived D2D transmission/reception or for short D2D transmission time lower than a threshold (N2 seconds). The threshold may be configured by the network or pre-configured.

D2D specific barring parameters for access class barring (ACB) function, extended access barring (EAB) function, service specific access control (SSAC) function, or D2D specific access control function: For example, the D2D mode criterion may indicate D2D specific barring factor/time. For example, the D2D mode criterion may indicate D2D mode 1 specific barring factor/time, and D2D mode 2 specific barring factor/time. For example, the D2D mode criterion may indicate D2D related service/application specific barring factor/time, e.g. D2D voice service specific barring factor/time, D2D non-voice service specific barring factor/time. For example, the D2D mode criterion may indicate D2D specific barring factor/time for UEs performing D2D transmissions, and D2D specific barring factor/time for UEs performing D2D receptions.

The D2D mode criterion may be received via system information. Or, The D2D mode criterion may be received via a dedicated signaling on DCCH. The RRC layer of the UE may forward the received D2D mode criterion to the NAS layer of the UE. Further, for all information elements of the D2D mode criterion described above, two sets of information elements may be separately provided, so that one set is for UEs performing D2D transmission and the other set is for UEs performing D2D receptions. If the UE is performing both D2D transmission and D2D reception, the UE may apply the set of information elements provided for UEs performing D2D transmission. If only one set of the information elements is provided, the set of information elements may be applied to the UE performing D2D transmission, UE performing D2D receptions, or both UEs, which may be indicated by the network.

In step S210, when the UE in RRC_IDLE camps on a cell, when the UE moves to RRC_IDLE, when the UE in RRC_IDLE or RRC_CONNECTED determines start of D2D transmission or D2D reception, or when the UE performs handover to a target cell, the UE in RRC_IDLE or RRC_CONNECTED performs a D2D mode procedure based on the D2D mode indicated by the D2D mode criterion. The D2D mode procedure may be performed at NAS layer and/or RRC layer of the UE. If two sets of information elements are separately provided for all information elements of the D2D mode criterion, one of which is for UEs performing D2D transmission and the other is for UEs performing D2D receptions, the UE may perform the D2D mode procedure based on the corresponding information elements of the D2D mode criterion.

If the D2D mode criterion indicates mapping between a specific service/application and D2D mode, and if the UE should be in the D2D mode 1 for a specific service/application, the UE may perform D2D communication in the D2D mode 1 to transmit or receive the particular service/application over direct interface. And, if the UE should be in the D2D mode 2 for a specific service/application, the UE may perform D2D communication in the D2D mode 2 to transmit or receive the specific service/application over direct interface.

If the D2D mode criterion indicates mapping between QoS characteristics and D2D mode, and if the UE should be in the D2D mode 1 for QoS of a specific service/application, the UE may perform D2D communication in the D2D mode 1 to transmit or receive the specific service/application over direct interface. And, if the UE should be in the D2D mode 2 for QoS of a specific service/application, the UE may perform D2D communication in the D2D mode 2 to transmit or receive the specific service/application over direct interface.

If the D2D mode criterion indicates mapping between device types and D2D mode, and if the UE should be in the D2D mode 1 for UE's device type, the UE may perform D2D communication in the D2D mode 1. And, if the UE should be in the D2D mode 2 for UE's device type, the UE may perform D2D communication in the D2D mode 2.

If D2D mode criterion indicates mapping between RRC state and D2D mode, and if the UE should be in RRC_CONNECTED for the D2D mode that the UE operates for D2D transmission or D2D reception, the UE in RRC_IDLE may initiate RRC connection establishment procedure and then indicate the D2D mode to the network during or after RRC connection establishment. If the UE should be in RRC_IDLE for the D2D mode that the UE operates for D2D transmission or D2D reception, the UE in RRC_CONNECTED may indicate the D2D mode to the network or request RRC connection release to the network, unless the UE has any other reason for staying in RRC_CONNECTED.

If the D2D mode criterion indicates mapping between a specific service/application and RRC states, and if the UE should be in RRC_CONNECTED for a specific service/application, the UE in RRC_IDLE may initiate RRC connection establishment procedure and then indicate the specific service/application to the network during or after RRC connection establishment. If the UE should be in RRC_IDLE for a specific service/application, the UE in RRC_CONNECTED may indicate the specific service/application to the network or request RRC connection release to the network, unless the UE has any other reason for staying in RRC_CONNECTED.

If the D2D mode criterion indicates mapping between QoS characteristics and RRC states, and if the UE should be in RRC_CONNECTED for QoS of a specific service/application, the UE in RRC_IDLE may initiate RRC connection establishment procedure and then indicate the QoS characteristics of the specific service/application to the network during or after RRC connection establishment. If the UE should be in RRC_IDLE for QoS of a specific service/application, the UE in RRC_CONNECTED may indicate the QoS characteristics of the specific service/application to the network or request RRC connection release to the network, unless the UE has any other reason for staying in RRC_CONNECTED.

Further, if any information is provided by the eNB, the UE may determine that the UE should be in RRC_CONNECTED/ECM-CONNECTED for the D2D mode 1 and in RRC_IDLE/ECM-IDLE for the D2D mode 2.

If the RRC of the UE forwards the received D2D mode criterion to the NAS layer of the UE, and if the NAS layer of the UE in ECM-IDLE determines transmission of service request for D2D communication or D2D discovery because the UE should enter RRC_CONNECTED, in step S220, the NAS layer of the UE transmits a service request message to the RRC layer of the UE by providing the following indications to the RRC layer of the UE.

D2D communication or D2D discovery for this RRC connection establishment;
D2D mode 1 and/or mode 2 for this RRC connection establishment;
New establishment cause specific to D2D for this RRC connection establishment.

The service request message may include a service type and QoS characteristics of a specific service/application. The service request message may be transmitted to the MME.

Upon receiving the service request message, or if the RRC layer of the UE in RRC_IDLE determines initiation of RRC connection establishment for D2D communication or D2D discovery, in step S230, the UE initiates RRC connection establishment for D2D communication or D2D discovery. During RRC connection establishment, the UE may perform barring check specific to D2D communication and/or D2D discovery. If the barring check is passed, the UE may transmit random access preambles and RRC connection request/RRC connection setup complete message to the eNB. In this case, the random access preamble may be dedicated to D2D commination and/or D2D discovery. The RRC connection request/RRC connection setup complete message may indicate D2D communication/discovery, D2D mode 1/2, and/or a new establishment cause specific to D2D.

Figure 11:
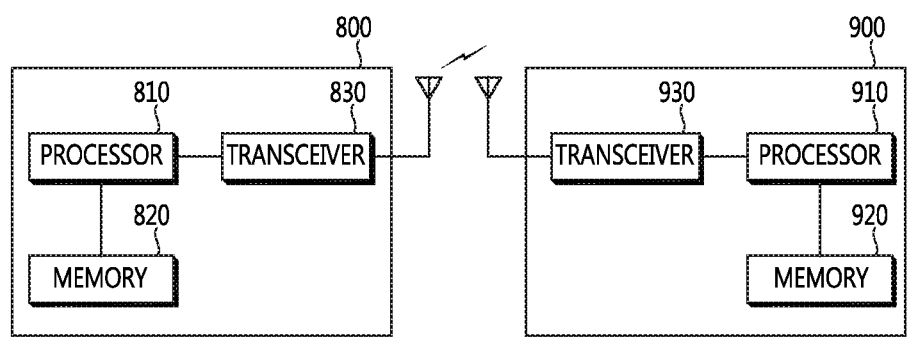
FIG. 11 shows a wireless communication system to implement an embodiment of the present invention.

FIG. 11 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), a device-to-device (D2D) operation in a wireless communication system, the method comprising:
   receiving, by the UE, a D2D mode criterion from a network, wherein the D2D mode criterion indicates that D2D mode 1 corresponds to radio resource control (RRC) connected state and D2D mode 2 corresponds to RRC connected state or RRC idle state, and wherein the D2D mode criterion includes a D2D specific barring factor corresponding to the D2D operation;
   performing, by the UE, the D2D operation using the D2D mode 2 in the RRC idle state;
   initiating, by the UE, RRC connection establishment for D2D communication;
   performing, by the UE, barring check based on the received D2D specific barring factor during the RRC connection establishment; and
   performing, by the UE, the D2D operation using the D2D mode 1 or the D2D mode 2 in the RRC connected state, if the barring check is passed.

2. The method of claim 1, wherein the D2D mode criterion indicates that a specific D2D mode is used for the D2D operation if a specific type of traffic is provided over a direct interface between UEs.

3. The method of claim 1, wherein the D2D mode criterion indicates that a specific D2D mode is used for the D2D operation if the UE is in a connected mode.

4. The method of claim 1, wherein the D2D mode criterion indicates a mapping between device types and D2D modes including the D2D mode 1 and the D2D mode 2.

5. The method of claim 1, wherein the D2D mode criterion indicates a mapping between quality of service (QoS) characteristics and D2D modes including the D2D mode 1 and the D2D mode 2.

6. The method of claim 1, wherein the D2D mode criterion is received via system information or a dedicated signaling.

7. The method of claim 1, wherein the D2D mode criterion is forwarded from a RRC layer to a non-access stratum (NAS) layer.

8. The method of claim 7, wherein a service request message is provided from the NAS layer to the RRC layer.

9. The method of claim 1, further comprising transmitting random access preambles, dedicated to the D2D operation, to the network.

10. The method of claim 1, further comprising transmitting a RRC connection request message or a RRC connection setup complete message, which indicate at least one of the D2D operation, D2D modes or a new establishment cause specific to the D2D operation.

11. The method of claim 1, wherein the D2D mode 1 is related to scheduled resource allocation by the network performed in the RRC connected state, and the D2D mode 2 is related to UE autonomous resource selection performed in the RRC idle state.

12. A user equipment (UE), the UE comprising:
   a memory;
   a transceiver; and
   a processor coupled to the memory and the transceiver, and configured to:
   receive a device-to-device (D2D) mode criterion from a network, wherein the D2D mode criterion indicates that D2D mode 1 corresponds to radio resource control (RRC) connected state and D2D mode 2 corresponds to RRC connected state or RRC idle state, and wherein the D2D mode criterion includes a D2D specific barring factor corresponding to the D2D operation;
   perform the D2D operation using the D2D mode 2 in the RRC idle state;
   initiate RRC connection establishment for D2D communication;
   perform barring check based on the received D2D specific barring factor during the RRC connection establishment; and
   perform the D2D operation using the D2D mode 1 or the D2D mode 2 in the RRC connected state, if the barring check is passed.

* * * * *